United States Patent [19]
Grego

[11] 3,861,494
[45] Jan. 21, 1975

[54] SOUND ABSORBING DEVICE
[75] Inventor: Thomas E. Grego, Waverly, N.Y.
[73] Assignee: Ingersoll-Rand Company, Woodcliff Lake, N.J.
[22] Filed: Nov. 19, 1973
[21] Appl. No.: 417,224

[52] U.S. Cl............... 181/33 A, 30/168, 181/36 A, 188/1 B, 299/94
[51] Int. Cl............................................ E21c 13/00
[58] Field of Search ... 181/33 A, 33 B, 33 M, 36 A; 173/DIG. 2, 139; 145/29 B; 188/1 B; 299/94

[56] References Cited
UNITED STATES PATENTS

| | | | |
|---|---|---|---|
| 2,451,217 | 10/1948 | Heinrich | 188/1 B X |
| 2,699,696 | 1/1955 | Hahn | 188/1 B X |
| 2,819,775 | 1/1958 | Everett | 188/1 B |
| 3,172,438 | 3/1965 | Gianelli | 145/29 B |
| 3,601,229 | 8/1971 | Shurtliff | 188/1 B |
| 3,774,730 | 11/1973 | Maddux | 188/1 B |

FOREIGN PATENTS OR APPLICATIONS

| 664,536 | 6/1963 | Canada | 145/29 B |
|---|---|---|---|

Primary Examiner—Richard B. Wilkinson
Assistant Examiner—John F. Gonzales
Attorney, Agent, or Firm—Walter C. Vliet

[57] ABSTRACT

A device for use with impact receiving members to reduce the noise generated on impact while substantially transmitting the impact through the member. The device comprises a liquid filled chamber within the impact member which contains a high inertial rod member. Sound vibrations caused by impact are picked up by the rod. The controlled movement of the rod neutralizes the vibration and changes the familiar sharp ringing sound when a metal impact member is struck into a dull, thud sound.

1 Claim, 2 Drawing Figures

PATENTED JAN 21 1975  3,861,494

SOUND ABSORBING DEVICE

BACKGROUND OF THE INVENTION

The present invention relates to the reduction of sound emitted from a relatively hard structure, such as a steel member, when struck or impacted upon. Particularly the tools utilized for vibratory or impact machines such as paving breakers, rock drills, riveters, or chisels have been known to emit a loud noise from the "ringing" of the steel work points.

In the past attempts have been made to minimize the ringing of the steel by attaching resilient collars around the tool point. This has been moderately successful when damage to the resilient collar is minimal and the added bulk around the tool can be tolerated. Other attempts have centered on enclosing the tool in a sound absorbing material to absorb the ringing noise or by means of resilient mountings or impact surfaces. Enclosing the tool is difficult especially in portable tools where visibility of the work area is important. Resilient impact surfaces result in a loss of tool efficiency.

SUMMARY OF THE INVENTION

The object of the present invention is to provide a compact, inexpensive and internal means for reducing the "ringing" of steels or similar hard materials subject to impact loadings. The sound absorbing device of this invention is not subject to damage from hazards of the work area as would be the case with external means, nor does it interfere with portability of the tool or visibility of the work area. In addition, a distinct reduction of operator fatigue has been noted in impact chisel tools utilizing this invention.

In general, the object of this invention is obtained in a sound absorbing device for a percussion member comprising: a chamber within said member; a fluid medium disposed within said chamber; and an inertial member disposed in said fluid medium.

DESCRIPTION OF THE PREFERRED EMBODIMENT

Figure 1:
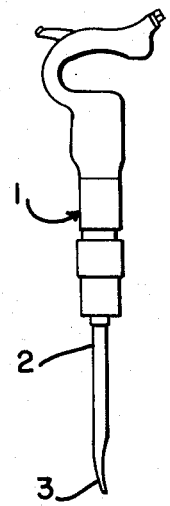
FIG. 1 shows an elevation view of an air hammer with a chisel or impact member constructed in accordance with one embodiment of the present invention.
Figure 2:
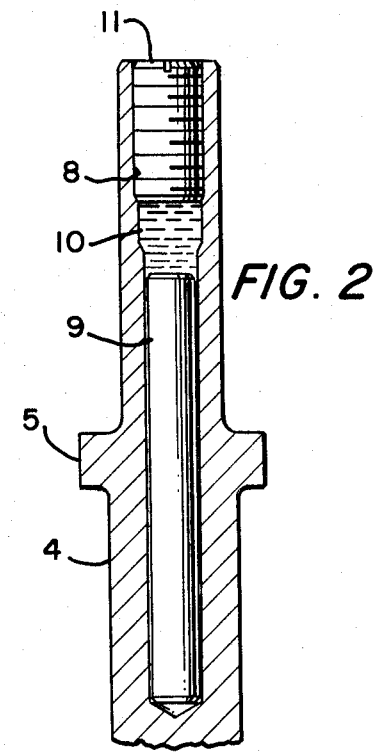
FIG. 2 is an elevation sectional view of the chisel or impact member constructed in accordance with a first embodiment of the present invention.

FIG. 1 shows an air hammer generally at 1 for use with a chisel point 2 or rivet set or similar tool. FIG. 2 shows a sectional view of a typical tool such as a chisel point 2 having a work point 3, shank 4, and retaining collar 5. Shank 4 is provided with an internal bore 7 which is counter-bored and threaded at 8. The internal bore 7 receives a mass member in the form of a sliding lead rod 9 which loosely fits in the bore and is capable of axial displacement within the bore. The remaining void of the bore is filled with a suitable liquid 10 or semi-liquid, such as oil or grease. The bore is closed by threaded retention plug 11 in the case of the first embodiment shown in FIG. 2. The amount of desired movement of sliding rod 9 is controlled by the retention plug. The speed of movement of the sliding rod 9 is controlled by the liquid used.

The proper relationship between bore size or shape, rod size or shape, clearance and liquid used to fill the bore is at present determined by simple experimentation and economy of manufacture. Lead has been found to be a suitable material for the sliding rod or inertial member. However, other materials, such as copper, steel, uranimum U238 (stable), or cast iron, may be effectively used. Lubricating oil and grease have been utilized to fill the bore around the loose fitting sliding rod in the embodiments shown. Other liquids, such as ethylene glycol, silicone fluid, hydraulic oil, mercury, or water may also be effectively used.

In operation the device of this invention acts as a viscous vibration damper converting noise energy into heat which is readily dissipated by conduction through the viscous fluid medium and the metal of the impact member to atmosphere.

Although the preferred embodiments of the invention have been shown and described, and several others suggested, it should be understood that the invention is not limited thereto, except by the scope of the claims. Various modifications and changes can be made without departing from the scope and spirit of the invention as the same will now be understood by those skilled in the art.

I claim:

1. A sound absorbing device for a percussion member comprising:
   a chamber within said member;
   a fluid medium disposed within said chamber;
   an inertial member disposed in said fluid medium;
   means to adjustably limit the movement of said inertial member;
   said percussion member is an impact tool work member such as a chisel;
   said chamber within said percussion member is a cylindrical chamber;
   said fluid medium is an oil lubricant;
   said inertial member is a lead rod disposed in said chamber with sliding clearance;
   said means to adjustably limit the movement of said inertial member comprises a screw adjustable oil retention plug axially disposed in said chamber.

* * * * *